US010778422B2

(12) United States Patent
Pfeiffer et al.

(10) Patent No.: US 10,778,422 B2
(45) Date of Patent: Sep. 15, 2020

(54) LITHOGRAPHICALLY DEFINED INTRINSIC IDENTIFIER

(71) Applicant: INTERNATIONAL BUSINESS MACHINES CORPORATION, Armonk, NY (US)

(72) Inventors: Dirk Pfeiffer, Croton on Hudson, NY (US); Sami Rosenblatt, White Plains, NY (US); Chandrasekara Kothandaraman, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 499 days.

(21) Appl. No.: 15/209,401

(22) Filed: Jul. 13, 2016

(65) Prior Publication Data
US 2018/0019881 A1    Jan. 18, 2018

(51) Int. Cl.
*H04L 9/08* (2006.01)
*G09C 1/00* (2006.01)

(52) U.S. Cl.
CPC .............. *H04L 9/0866* (2013.01); *G09C 1/00* (2013.01)

(58) Field of Classification Search
CPC ....... G06F 21/44; G06F 21/73; H04L 9/3278; H04L 9/0866
See application file for complete search history.

(56) References Cited

U.S. PATENT DOCUMENTS

| 6,738,294 | B2 | 5/2004 | Layman et al. |
| 7,757,083 | B2 | 7/2010 | Devadas et al. |
| 8,028,924 | B2 | 10/2011 | Anderson et al. |
| 8,350,339 | B2* | 1/2013 | Huang ............ H01L 21/823425 257/401 |
| 8,525,549 | B1 | 9/2013 | Feng et al. |
| 8,619,979 | B2 | 12/2013 | Ficke et al. |
| 8,747,713 | B2 | 6/2014 | Bruley et al. |
| 8,767,445 | B2 | 7/2014 | Chellappa et al. |
| 8,938,069 | B2 | 1/2015 | Orshansky |
| 9,576,914 | B2* | 2/2017 | Li .......................... H01L 23/576 |
| 2004/0060020 | A1* | 3/2004 | Pramanik ............ G06F 17/5081 716/53 |

(Continued)

OTHER PUBLICATIONS

Byong-Deok et al., Integrated Circuit Design for Physical Unclonable Function Using Differential Amplifiers, Analog Integrated Circuits and Signal Processing Mar. 2011, vol. 66, Issue 3, pp. 467-474 (Year: 2011).*

(Continued)

*Primary Examiner* — Paul E Callahan
(74) *Attorney, Agent, or Firm* — Tutunjian & Bitetto, P.C.; Vazken Alexanian

(57) ABSTRACT

Methods and systems for generating an identifier includes testing an operational characteristic for each device in an array of pairs of devices. Each pair of devices includes a first device and a second device. The first device of each pair has a higher inter-device uniformity for the operational characteristic than the second device of the pair. The operational characteristic between the first device and the second device is compared for each pair of devices to generate a respective identifier bit for each pair of devices. An identifier is generated from the identifier bits.

20 Claims, 6 Drawing Sheets

(56) References Cited

U.S. PATENT DOCUMENTS

| | | | |
|---|---|---|---|
| 2009/0051576 A1* | 2/2009 | Dedic | H03K 17/04123 |
| | | | 341/136 |
| 2015/0101037 A1* | 4/2015 | Yang | G06F 21/44 |
| | | | 726/16 |
| 2015/0364570 A1 | 12/2015 | van Meer et al. | |

OTHER PUBLICATIONS

Su Lee et al., Aspect Ratio Model for Radiation-Tolerant Dummy Gate Assisted n-MOSSFET Layout, International Scholarly Research Notices, vol. 2014, Article ID 145759, pp. 1-6, Hindawi Pub. Corp. 2014. (Year: 2014).*

Jiménez et. al: Analysis of Threshold Voltage Fluctuations Due to Short Channel and Random Doping Effects, Superf. vacío vol. 26 No. 1 México, Mar. 2013, pp. 1-3 (Year: 2013).*

Kalyanaraman, M. et al., "Novel strong PUF based on nonlinearity of MOSFET subthreshold operation" IEEE International Symposium on Hardware-Oriented Security and Trust (HOST) (Jun. 2013) pp. 13-18.

Zhang, X. et al., "Highly stable data SRAM-PUF in 65nm CMOS process" IEEE 10th International Conference on ASIC (ASICON) (Oct. 2013) pp. 1-4.

Forte, D. et al., "Improving the Quality of Delay-Based PUFs via Optical Proximity Correction" IEEE Transactions on Computer-Aided Design of Integrated Circuits and Systems (Dec. 2013) pp. 1879-1891, vol. 32, No. 12.

Holcomb, D.E. et al., "Power-up SRAM state as an identifying fingerprint and source of true random numbers" IEEE Transactions on Computers (Sep. 2009) pp. 1198-1210, vol. 58, No. 9.

Li, W.K. et al., "Inducing Device Variation for Security Applications" U.S. Appl. No. 14/707,442, filed May 8, 2015.

* cited by examiner

LITHOGRAPHICALLY DEFINED INTRINSIC IDENTIFIER

BACKGROUND

Technical Field

The present invention generally relates to physically unclonable functions and, more particularly, to devices that exploit fabrication variability to create a unique identifier.

Description of the Related Art

Physically unclonable functions (PUFs) are used to uniquely identify a piece of hardware by providing a unique identifying signal that is difficult to counterfeit. PUFs have the following basic properties: 1. They cannot be easily copied; 2. They are read out in a non-obvious manner (e.g., no optical readout); 3. They are unique; and 4. They generate a highly reproducible output, even with a fuzzy readout.

Existing attempts at creating PUFs suffer from a lack of reproducibility in measurement. In particular, it is difficult to ensure that the measurement of a given PUF will be consistent from one measurement to the next. For example, temperature variations may cause changes in the measurable properties of a PUF.

SUMMARY

A method for generating an identifier includes testing an operational characteristic for each device in an array of pairs of devices. Each pair of devices includes a first device and a second device. The first device of each pair has a higher inter-device uniformity for the operational characteristic than the second device of the pair. The operational characteristic between the first device and the second device is compared for each pair of devices to generate a respective identifier bit for each pair of devices. An identifier is generated from the identifier bits.

A method for verifying whether an object is genuine includes testing a threshold voltage for each transistor in an array of pairs of transistors. Each pair of transistors includes a first transistor and a second transistor. The first transistor of each pair has a higher inter-device uniformity for the threshold voltage than the second transistor of the pair. The threshold voltage between the first transistor and the second transistor for each pair of transistors is compared to generate a respective identifier bit for each pair of transistors. An identifier is generated from the identifier bits. The generated identifier is looked up in an identifier database to determine whether the object is genuine.

A system for generating an identifier includes an array of pairs of devices. Each pair of devices includes a first device and a second device. The first device of each pair has a higher inter-device uniformity for the operational characteristic than the second device of the pair. A comparator module includes a processor configured to test an operational characteristic for each device in the array, to compare the operational characteristic between the first device and the second device for each pair of devices to generate a respective identifier bit for each pair of devices, and to generate an identifier from the identifier bits.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention use arrays of device pairs to create a physically unclonable function (PUF). In particular, one device from each pair is fabricated in such a way as to produce a device with relatively high uniformity in device characteristics between the pairs, while the other device from each pair is fabricated in such a way as to produce a device with relatively high variability in device characteristics. In this manner, the variable device in each pair is compared to the uniform device in each pair to provide a single bit of the identifier. The pairs of the array are then used to generate a sequence of bits that form the full identifier. It should be noted that the average values for both the uniform devices and the variable devices is the same, making their values directly comparable.

In one embodiment, the distinction between the uniform device and the variable device in each pair is that the uniform device is fabricated using resolution enhancement techniques (RETs) to improve uniformity from one device to the next, while the variable device is fabricated without using RETs. In a second embodiment, to achieve a measurable distinction between the uniform devices and the variable devices, dummy structures are omitted from the variable devices. Dummy structures may be used to provide a reproducible channel length. By removing such structures from certain devices, the characteristics of those devices will be made variable from one device to the next. In either case, the characteristics that are compared between the devices in a given pair may include, for example, the threshold voltage of a transistor.

Figure 1:
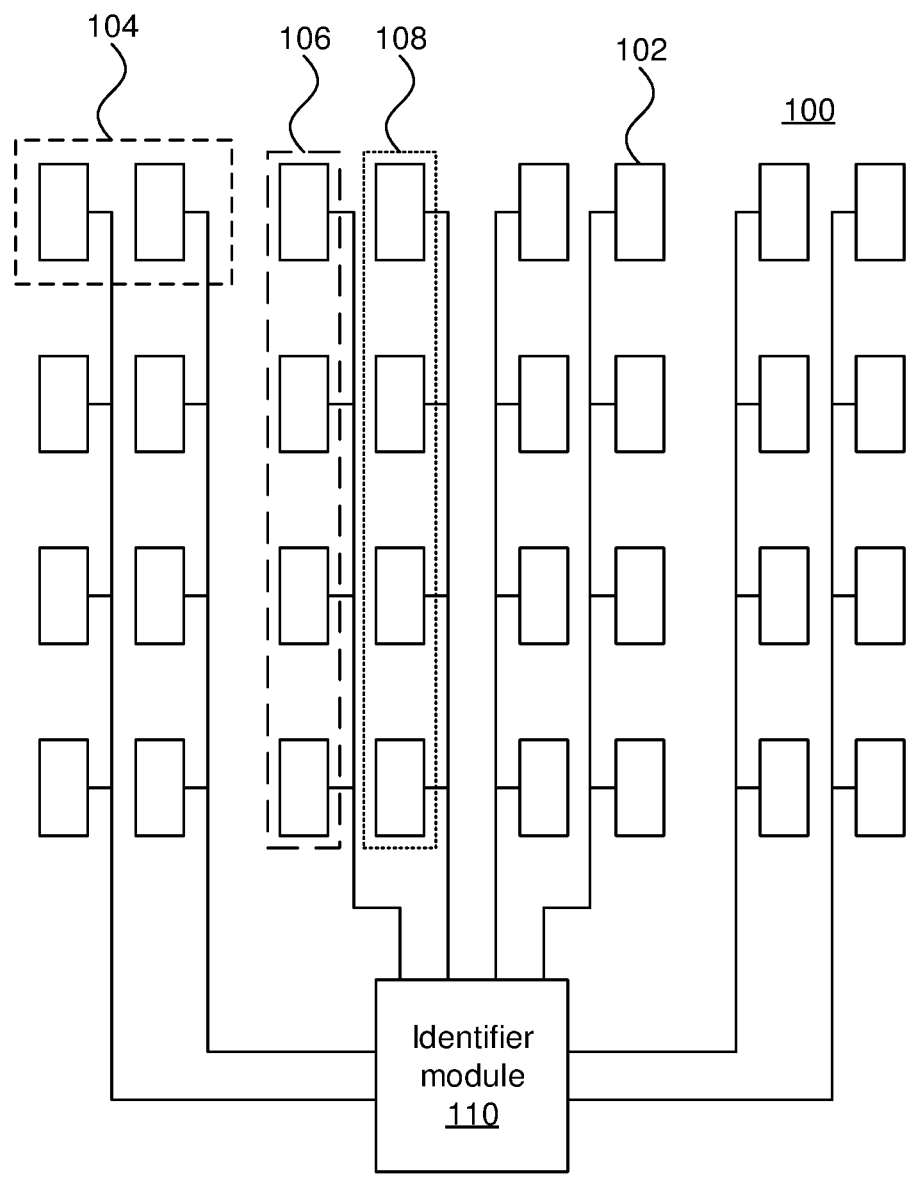
FIG. 1 is a diagram of a physically unclonable function based on an array of pairs of devices in accordance with the present principles.

Referring now to FIG. 1, an identifier system 100 is shown. The identifier system 100 is formed of an array of devices 102. The array is broken up into pairs 104 of devices 102. Each pair 104 includes one device 106 that was formed in a process designed to promote uniformity, while the other device 108 was formed in a process designed to allow significantly more variability from one device to the next than the process that formed the first device 106. As will be addressed in greater detail below, there are many different ways in which one set of devices may be designed with greater random variability in their operational characteristics than in another set of devices.

An identifier module 110 is operationally connected to each device 102 in the array. In particular, the identifier module 110 is able to activate each device 102 in such a way as to reveal one operational characteristic of the device in question. It is specifically contemplated that transistors may be used, and transistors are therefore described as particular embodiments of the devices 102 herein, but it should be understood that any type of device may be used if the distinction between relatively uniform devices 106 and relatively randomly variable devices 108 is maintained. In the case of transistors, it is specifically contemplated that the threshold voltage of each device 102 may be evaluated, measured by, e.g., ramping up an applied voltage until the device in question triggers.

The identifier module 110 tests each pair 104 in sequence, comparing the variable device 108 to the uniform device 106 to determine which has a value for the characteristic being tested that is greater than the other. The identifier module 110 then assigns a bit value to the pair 104 in accordance with the comparison. For example, if the variable device 108 has a value that is greater than that of the uniform device 106, the identifier module 110 may assign a logical '1' to that pair 104. On the other hand, if the variable device 108 has a value that is lower than that of the uniform device 106, the identifier module 110 may assign a logical '0' to that pair 104. The identifier module 110 does this for each pair 104 and builds an identifier bit sequence based on each of the pairs 104 in the array, outputting the identifier bit sequence as an identifier for the identifier system 100.

Figure 2:
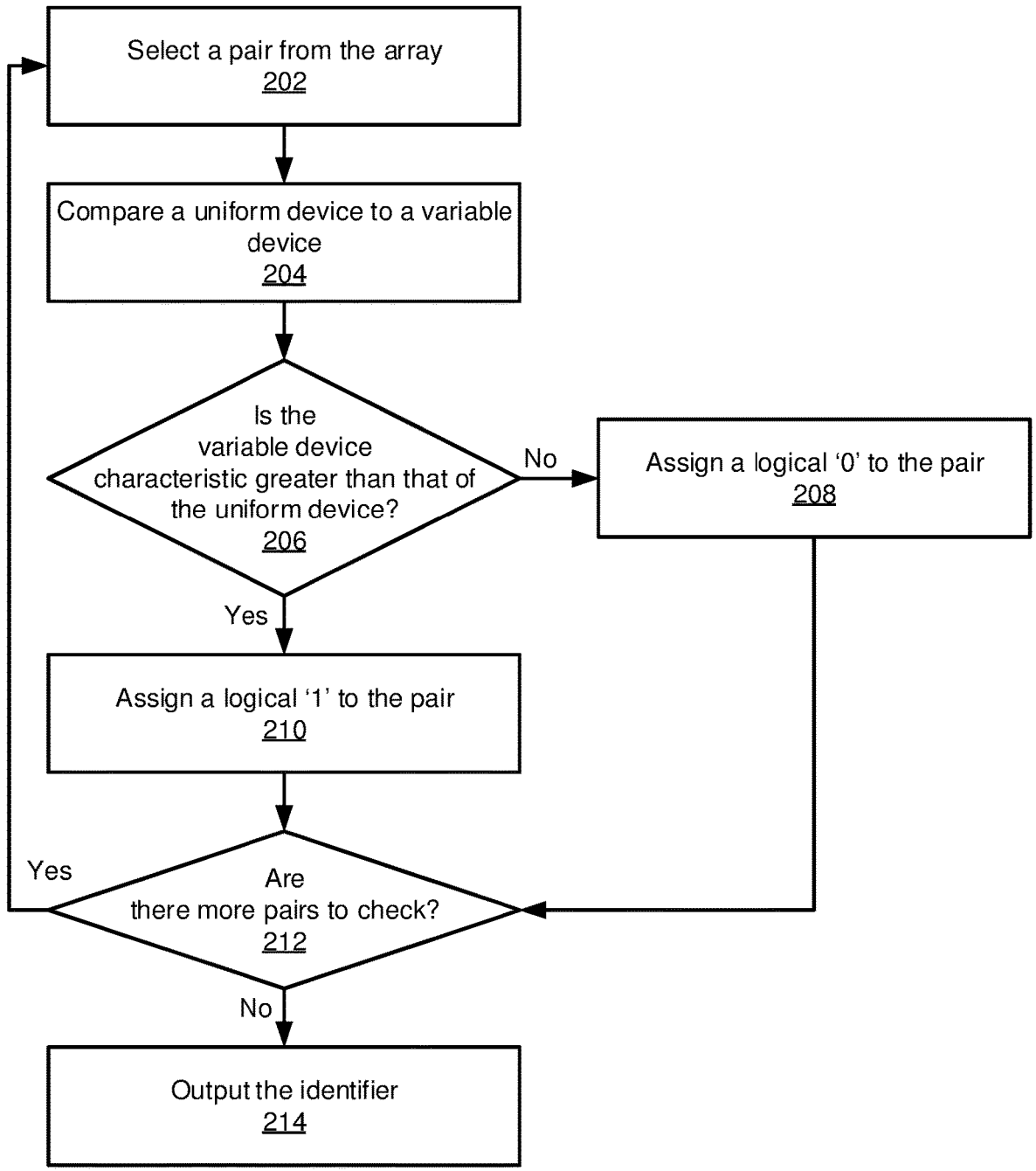
FIG. 2 is a block/flow diagram of a method of generating an identifier based on a physically unclonable function based on an array of pairs of devices in accordance with the present principles.

Referring now to FIG. 2, a method of reading an identifier is shown. Block 202 selects a pair 104 from the array of devices 102. As noted above, the pair 104 includes a uniform device 106 and a variable device 108. Block 204 compares the uniform device 106 to the variable device 108 according to some operational characteristic (e.g., threshold voltage).

Block 206 determines whether the operational characteristic of the variable device 108 has a value that is greater than the value of the operational characteristic of the uniform device 106. If so, block 210 assigns a logical '1' to the pair 104. If not, block 208 assigns a logical '0' to the pair. This represents a single bit of the identifier and is added to a bit string. Block 212 determines whether there are any more pairs 104 left in the array of device 102 that have not yet been checked. If so, processing returns to block 202 and a new pair 104 is selected from the array. If not, block 214 outputs the completed identifier.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
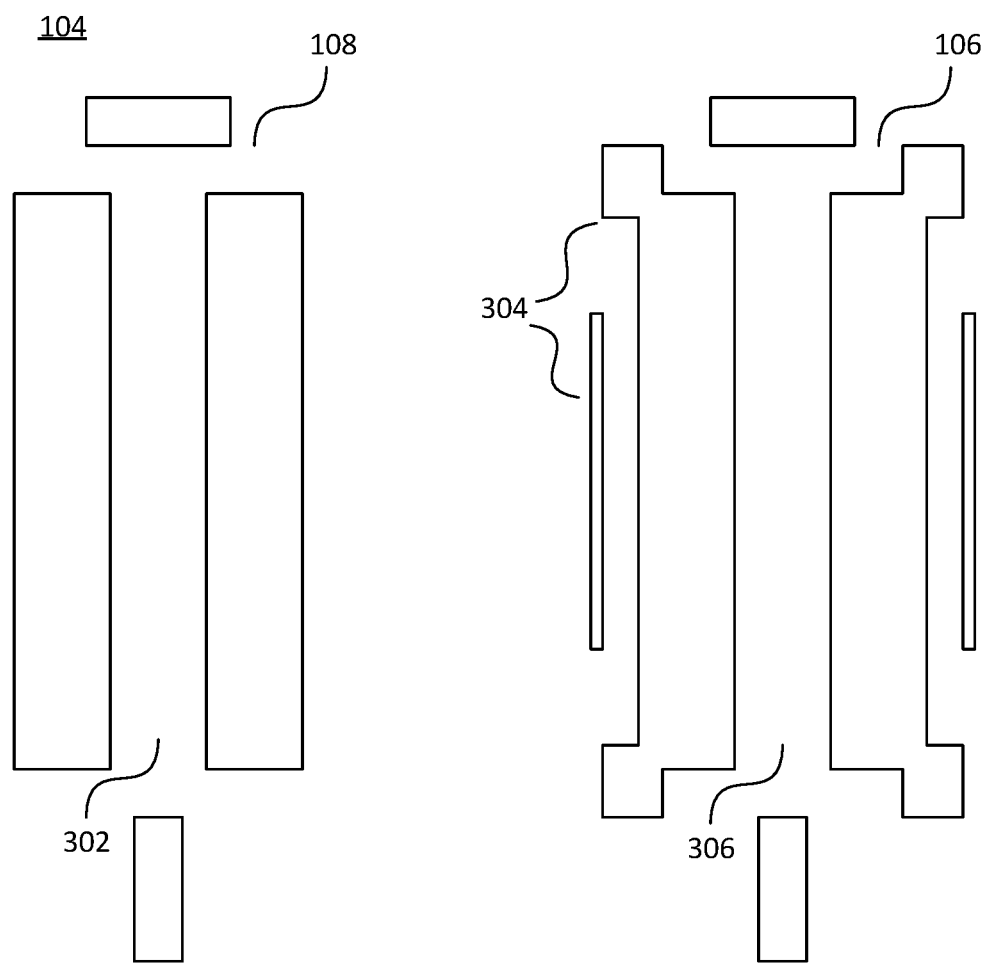
FIG. 3 is a diagram of the selective use of resolution enhancement features to improve the uniformity of one device in a pair of devices in accordance with the present principles.

Referring now to FIG. 3, a first embodiment of a device pair 104 is shown. In this embodiment, resolution enhancement techniques are used to improve the uniformity of the uniform devices 106. Due to the limitations of photolithographic fabrication processes, aberrations and irregularities may be produced when fabricating structures near the minimum feature size of the lithographic technology. In one specific example, resolution improvement can be obtained by creating additional structures 304 which, due to interference effects and other optical phenomena, causes the lithographic process to behaving in a more predictable fashion. It should be understood that there are many forms of resolution improvement techniques in the art, and those having ordinary skill in the art can employ any of them appropriate to create the uniform devices 106 with a high degree of inter-device uniformity in, e.g., the channel length 306.

In contrast, the variable devices 108 may be formed without the use of the resolution improvement techniques. The result is a device that has, for example, a channel length 302 that varies significantly from one device to the next. The channel lengths 302 and 306 affect operational characteristics of the respective devices including, e.g., threshold voltage of a transistor.

Figure 4:
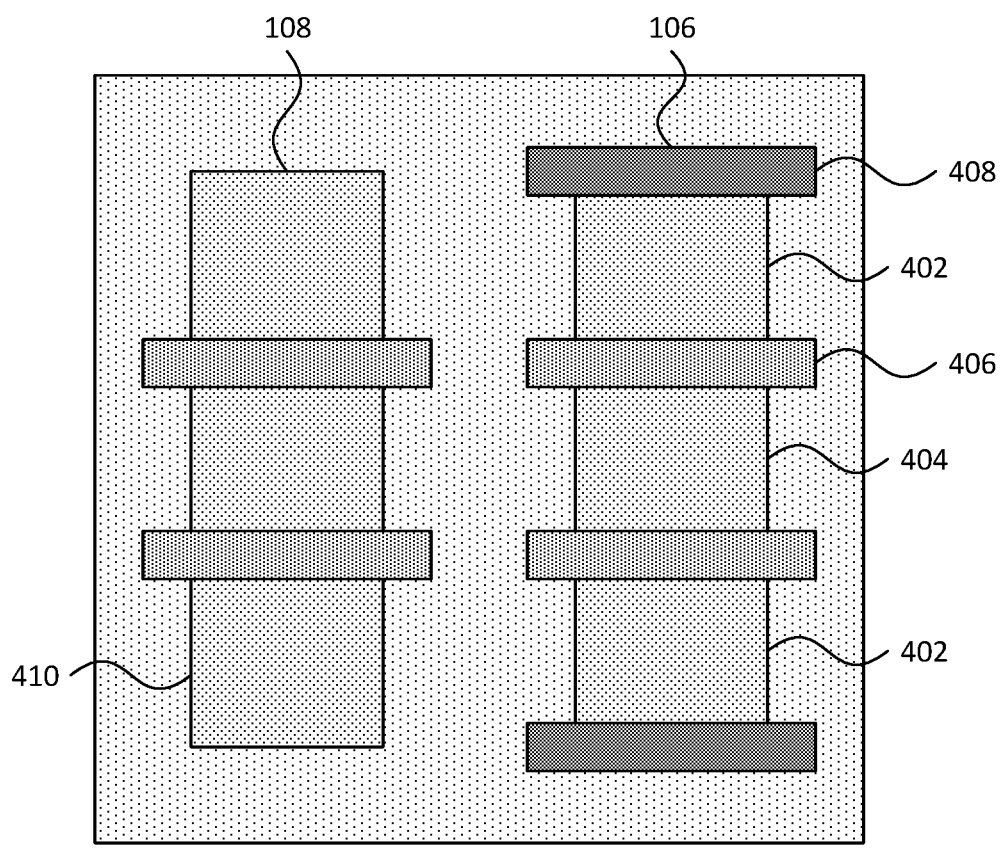
FIG. 4 is a diagram of a pair of devices in accordance with the present principles.

Referring now to FIG. 4, a second embodiment of a device pair 104 is shown. In this embodiment, transistors are formed having a source region 404 and drain regions 402 with gates 406 being formed over channel regions of the devices. In this embodiment, the uniform devices 106 are formed with additional dummy gate structures 408 over the ends of the drain regions 402. The practical effect of the dummy gate structures 408 is to promote uniformity in the size of the drain regions 402 which, in turn, affects the lengths of the electrical contacts needed to reach the drain regions 402. This produces a measurable change in the threshold voltage of the transistors.

In this embodiment, it is contemplated that the drain regions 402 and source regions 404 may be formed from a semiconductor fin 410, with the gate structures 406 and dummy gate structures 408 being formed over the semiconductor fins 410. It should be understood that the semiconductor fins 410 can be formed from any appropriate semiconductor material, although a silicon-containing material is specifically contemplated. Illustrative examples of silicon-containing materials suitable for the semiconductor fins 410, but are not limited to, silicon, silicon germanium, silicon germanium carbide, silicon carbide, polysilicon, epitaxial silicon, amorphous silicon, and multi-layers thereof. Although silicon is the predominantly used semiconductor material in wafer fabrication, alternative semiconductor materials can be employed, such as, but not limited to, germanium, gallium arsenide, gallium nitride, cadmium telluride, and zinc selenide. It is specifically contemplated that the gates 406 and dummy gates 408 may be formed from polysilicon, but alternative materials may be used instead. In the case of the gates 406, a replacement metal gate process may be used to form gates 406 from, e.g., tungsten, nickel, titanium, molybdenum, tantalum, copper, platinum, silver, gold, rubidium, iridium, rhodium, rhenium, and alloys thereof. The dummy gates 408, meanwhile, may be formed from any appropriate material, and need not be formed from a functional gate material.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 5:
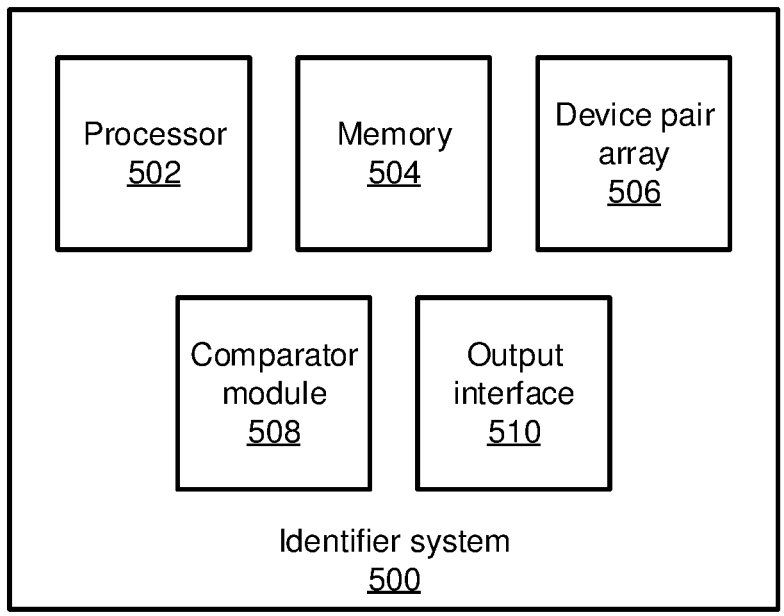
FIG. 5 is a block diagram of an identifier system in accordance with the present principles.

Referring now to FIG. 5, an identifier system 500 is shown. The identifier system 500 includes a hardware processor 502 and a memory 504. The identifier system 500 also includes the array 506 of devices 102, which is formed from pairs that have one uniform device 106 and one variable device 108. The identifier system 500 may further include one or more functional modules that are implemented as software that is stored in memory 504 and executed by hardware processor 502. In an alternative embodiment, the functional modules may be implemented as one or more discrete hardware components in the form of, e.g., application specific integrated chips or field programmable gate arrays.

A comparator module 508 reads outputs from each pair in the device pair array 506 and compares those outputs to one another. Based on the comparison, the comparator module 508 assigns a logical '1' or '0' to each pair 104 in the device pair array 506, and outputs the final identifier string using output interface 510.

Figure 6:
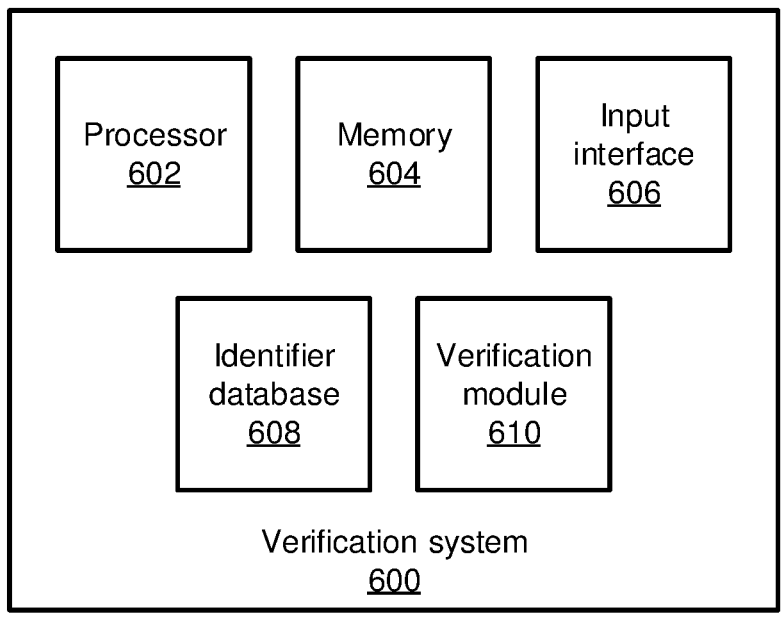
FIG. 6 is a block diagram of an identification verification system in accordance with the present principles.

Referring now to FIG. 6, further detail on the verification system 600 is shown. The verification system 600 includes a hardware processor 602 and a memory 604. The verification system 600 may further include one or more functional modules that are implemented as software that is stored in memory 604 and executed by hardware processor 602. In an alternative embodiment, the functional modules may be implemented as one or more discrete hardware components in the form of, e.g., application specific integrated chips or field programmable gate arrays.

An input interface 606 receives an identifier bit sequence from an identifier system 500. It should be understood that the identifier system 500 can be embedded in any appropriate device or object. A wired or wireless connection may be formed between the output interface 510 of the identifier system 500 and the input interface 606 of the verification system 600. A verification module 610 uses a database of identifiers 608 to determine whether the identifier bit sequence is a valid identifier. If the identifier bit sequence is present in the identifier database 608, then the verification module 610 indicates that the object associated with the identifier system 500 is genuine. If the identifier bit sequence is not present in the identifier database 608, then the verification module 610 indicates that the object is not genuine.

Figure 7:
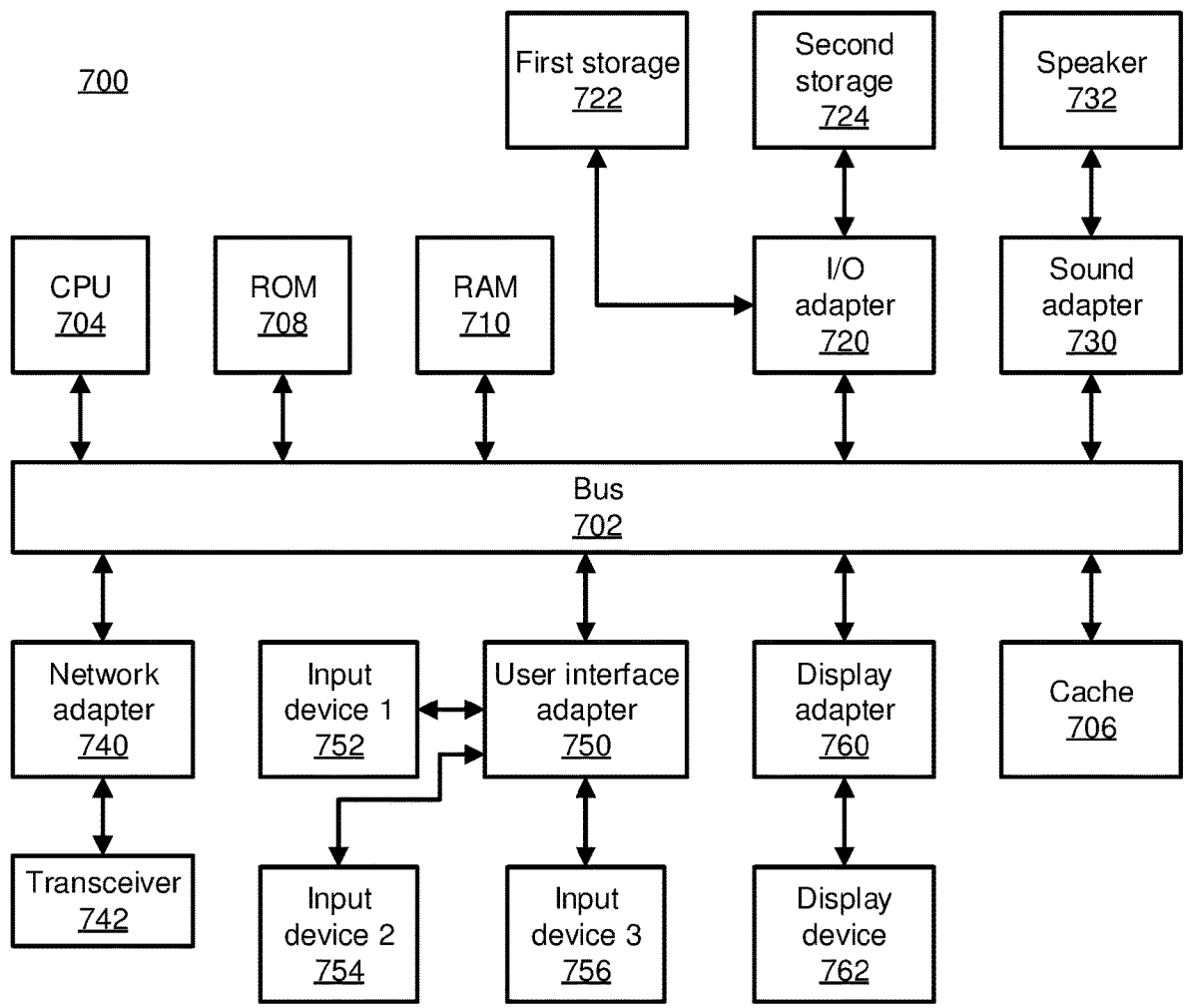
FIG. 7 is a block diagram of a processing system in accordance with the present principles.

Referring now to FIG. 7, an exemplary processing system 700 is shown which may represent the verification system 506. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating an identifier, comprising:
    testing an operational characteristic for each device in an array of devices that includes a set of multiple first devices and a distinct set of multiple second devices, wherein the set of first devices has a higher inter-device uniformity for the operational characteristic than the set of second devices;
    comparing the operational characteristic between pairs of devices, where each pair of devices includes a device from the set of first devices and a device from the set of second devices, to generate a respective identifier bit for each pair of devices; and
    generating an identifier from the identifier bits.

2. The method of claim 1, wherein generating respective identifier bits comprises assigning a logical '1' if the first device in a pair of devices has a value for the operational characteristic that is higher than the second device's value for the operational characteristic and assigning a logical '0' if the first device in the pair of devices has a value for the operational characteristic that is lower than the second device's value for the operational characteristic.

3. The method of claim 1, wherein each device in the set of first devices and the set of second devices comprises a transistor, and the operational characteristic is transistor threshold voltage.

4. The method of claim 1, wherein the first devices each comprise resolution enhancement features.

5. The method of claim 4, wherein the second devices each lack the resolution enhancement features.

6. The method of claim 1, wherein the first devices each comprise dummy gate structures at ends of a source or drain region.

7. The method of claim 6, wherein the second devices each lack the dummy gate structures.

8. The method of claim 1, wherein an average value for the operational characteristic for the set of first devices is the same as the average value for the operational characteristic for the set of second devices.

9. A non-transitory computer readable storage medium comprising a computer readable program for generating an identifier, wherein the computer readable program when executed on a computer causes the computer to perform the steps of:
    testing an operational characteristic for each device in an array of devices that includes a set of multiple first devices and a distinct set of multiple second devices, wherein the set of first devices has a higher inter-device uniformity for the operational characteristic than the set of second devices;
    comparing the operational characteristic between pairs of devices, where each pair of devices includes a device from the set of first devices and a device from the set of second devices, to generate a respective identifier bit for each pair of devices; and
    generating an identifier from the identifier bits.

10. A system for generating an identifier, comprising:
    an array of devices that includes a set of multiple first devices and a distinct set of multiple second devices, wherein the set of first devices has a higher inter-device uniformity for an operational characteristic than the set of second devices;
    a comparator module comprising a processor configured to test the operational characteristic for each device in the array, to compare the operational characteristic between pairs of devices, where each pair of devices includes a device from the set of first devices and a device from the set of second devices, to generate a respective identifier bit for each pair of devices, and to generate an identifier from the identifier bits.

11. The system of claim 10, wherein the comparator module is further configured to assign a logical '1' if the first device in a pair of devices has a value for the operational characteristic that is higher than the second device's value for the operational characteristic and assign a logical '0' if the first device in the pair of devices has a value for the operational characteristic that is lower than the second device's value for the operational characteristic.

12. The system of claim 10, wherein each device in the set of first devices and the set of second devices comprises a transistor.

13. The system of claim 12, wherein the operational characteristic is transistor threshold voltage.

14. The system of claim 10, wherein the first ef devices each comprise resolution enhancement features.

15. The system of claim 14, wherein the second devices each lack the resolution enhancement features.

16. The system of claim 10, wherein the first devices each comprise dummy gate structures at ends of a source or drain region.

17. The system of claim 16, wherein the second devices each lack the dummy gate structures.

18. The system of claim 10, wherein an average value for the operational characteristic for the set of first devices is the same as the average value for the operational characteristic for the set of second devices.

19. The system of claim 10, wherein the set of first devices has a higher inter-device uniformity for channel length than the set of second devices.

20. The system of claim 10, wherein the set of first devices has a higher inter-device uniformity for source/drain electrical contact length than the set of second devices.

* * * * *